106. COMPOSITIONS, COATING OR PLASTIC.

76

Patented Nov. 20, 1934

1,981,043

UNITED STATES PATENT OFFICE 1,981,043

COMPOSITION OF MATTER FOR MAKING A BUILDING UNIT

Arvid Hede, Detroit, Mich., assignor to Cinder Chrome Company, Detroit, Mich., a corporation of Michigan No Drawing. Application July 29, 1932, Serial No. 626,201

4 Claims. (Cl. 106—24)

My invention relates to a plastic composition for making an artificial marble formation.

The object of my invention is to produce a building unit of any size or design having an outer surface appearance of polished marble, and a resisting strength comparing closely to marble rock.

Another object is to produce an imitation marble block surface that can be reproduced in any desired color or surface design, representing various grades and textures of marble formation, yet provide a hard material that can be readily sawed into various desired shapes and sizes of building units.

A further object is to produce an artificial marble slab that can be readily joined with other building materials in their plastic states and become an integral part thereof.

A still further object is to re-produce imitation marble slabs having finished, polished, glazed surfaces resulting from the moulding of the materials, and without further machine or hand polishing.

My plastic composition is especially adapted for manufacturing thin slabs of stone like material, either of large or small dimensions, or the slabs sawed into small building blocks or brick designs, and used for surface covering for building walls, either for inside or outside construction.

It is known that there are various types and kinds and compositions of artificial marble being used and on the market at the present time, but not of the composition and structure as herein set forth.

Great difficulty has been experienced in producing imitation marble materials and surfaces, in securing a durable grade of material that will withstand the severe weather conditions and retain its perfect imitation marble surface markings, and at the same time produce a composition that can readily be moulded without injury to the finished glazed surface. Many of the compositions now used result in a brittle material, cracking and breaking easily, disintegrate when subjected to the various weather conditions and fail to properly crystallize to form a perfect glazed polished surface.

In my composition I have accomplished a mixture of ingredients and materials that result in a solid, non-porous rock formation of great strength, and that will readily mould from its plastic state into a perfect, glazed, polished imitation marble surface having the natural marble markings, and is easily removed from the mould when sufficiently dried. This artificial marble material has a very high crushing strength nearly equal to solid rock formation, yet it may be readily sawed into sections for various designs of building units by the ordinary stone saw.

In carrying out my invention I use ingredients and materials that may readily be formed into a plastic composition suitable for moulding in a special building unit form, that will harden to a consistency of solid non-porous rock formation, and will so crystallize as to form a perfect glazed, polished surface that will not adhere to the special mould surfaces.

In preparing my composition I use a base mixture formed of cement and marble dust or fine sand and with some kind of mineral coloring ingredient added thereto, and a special mixing solution formed of a mixture of sodium silicate, boracic acid, casein, sal-ammoniac and water, and for the imitation marble surface coloring and markings, small portions of the above special mixing solution are separated in separate dishes and each mixed with a chosen color of some mineral coloring ingredient, one for each marble surface color desired.

For the base mixture, using cement as a unit portion for comparison with the proportions of the other ingredients and materials used, the preferred mixture and proportions are as follows:

Cement _____ 1 part
Marble dust or fine sand_____ 1¼ parts
Mineral color_____ variable amounts,
  as may be required to produce the desired base
  color, the term "part" or "parts" as above used
  meaning proportions by measure.

In all cases it is desired to use clear white cement to insure clear cut imitation marble surface markings. The cement, marble dust or sand together with the chosen mineral coloring ingredient are all thoroughly mixed together in a dry pulverized state, forming as nearly as possible a homogeneous mixture. The cement used may be of any high grade cement, preferably white, such as Portland cement now commonly sold on the market, and with any fine grade of marble dust or fine clean sand free from all other substances, or any other suitable finely pulverized rock aggregate. The mineral coloring ingredient may be varied as the color desired for the marble is varied, but should be of a character that will not disintegrate and preferably will mix with or form a water solution.

For the special mixing solution, using water as a unit portion of comparison of some stated amount, and with the other ingredients stated in proportion thereto, the preferred proportions for a specified mixture for producing the highest grade of artificial marble with the clearest imitation marble surface markings, are as follows:

| | |
|---|---|
| Water | 30 gal. |
| Sodium silicate | 2½ lbs. |
| Boracic acid | 1¼ lbs. |
| Casein | 3½ lbs. |
| Sal-ammoniac | 4½ ozs. |

The sodium silicate, boracic acid, casein, and sal-ammoniac are each dissolved separately in water, preferably at about 100° to 150° F. The sodium silicate and boracic acid solutions are mixed together, also the casein and sal-ammoniac solutions are mixed together which forms a glue like composition, the two resulting solutions are then mixed together and the remainder of the 30 gallons of water not used in making said separate solutions is then mixed therewith.

To this combined solution is added sufficient of the base mixture of cement, marble dust or sand and mineral color to reduce same to a plastic state, and after thoroughly mixing together is poured into a mould formed of a flat polished surface bottom, such as plate glass or other highly polished material, and which has been previously painted, colored, spotted and marked in marble designs from the several special colored solutions heretofore referred to and described as made from a part of the mixing solution, and as is more fully set forth in my process patent application Serial No. 626,200 filed July 29, 1932, and which is to be considered a part thereof, the special paint solutions being applied to the mould bottom with a brush end, stick or hand as required to re-produce the desired marble surface markings.

While the cement and sand harden into a stone like base from the plastic mixture, it is further acted upon by the sodium silicate and boracic acid solutions for hardening and crystallizing the particles and producing a glazed polished surface from the mould bottom. The previous painting of the polished mould bottom with the prepared colored solutions also prevent bubble formations of the finished surface.

The casein acts to fill all pores in the composition, resulting in a solid, non-porous stone formation of greatly added strength. Casein is an albumen product, chiefly the residue of the whey of milk. A product known as "cracetol" may be also used in the place of the casein, both being similar albumen products but the cracetol is a more refined and high grade product containing less fat, and when dissolved in the sal-ammoniac it not only acts as a binder but aids in the crystallization sufficiently to allow the hardened, glazed marble slab to be easily removed from the polished mould bottom and without any injury thereto.

The marble slab may be allowed to stand within the mould for a period of from three to fifteen days, preferably in a temperature of from 75° to 100° F., and the reaction of the above applied solution thereon resulting in a hardened material with a consistency of rock.

If a cheaper grade of imitation marble is desired the special mixing solution may be compounded from the sodium silicate and boracic acid alone, or it may be made from the casein and sal-ammoniac alone, but in the former case the resulting mixture is somewhat gaseous and will require considerable vibration to expel the air bubbles therefrom, while in the latter case the mixture will result in a somewhat inferior grade of marble.

While the foregoing formulas comprise the best mixture for the most desirable artificial marble product, a very good grade of imitation marble may be obtained by varying the proportions of the various ingredients used therein between certain limits, and for the purpose of comparison of proportions of the different ingredients, water will be used as a unit portion as in the former case to define specified amounts of the mixing solution, and one part of cement used as a unit portion for the base mixture, the term "part" meaning by measure as in the former case, the proportions of the various ingredients being varied between the following limits:

| | |
|---|---|
| Water | 30 gal. |
| Sodium silicate | 2 lbs. to 3 lbs. |
| Boracic acid | 1 lb. to 1¼ lbs. |
| Casein | 2¼ lbs. to 5 lbs. |
| Sal-ammoniac | 2¼ ozs. to 7 ozs. |
| Cement | ½ part to 2 parts |
| Marble dust or sand | ½ part to 3 parts |
| Mineral color | variable in amounts as required to produce the desired marble colors. |

Having fully described my composition of matter, what I claim as my invention and desire to secure by Letters Patent is:

1. An artificial marble composition adapted for making building construction units, comprising a mixture of cement, marble dust and a mineral coloring ingredient, all made into a plastic composition by a solution of sodium silicate, boracic acid, casein and sal-ammoniac.

2. An artificial marble composition adapted for making a building construction unit, comprising a mixture of white cement, sand and a mineral coloring ingredient, all made into a plastic composition by a solution of sodium silicate, boracic acid, casein, sal-ammoniac and water.

3. An artificial marble composition adapted for making a building construction unit, comprising a mixture in proportion of about one part white cement to one and one fourth parts of sand, and a variable amount of a mineral coloring ingredient, all made into a plastic composition by a solution comprising proportions of about thirty gallons of water; sodium silicate 2½ pounds; boracic acid 1¼ pounds; casein 3½ pounds; and sal-ammoniac 4½ ounces.

4. An artificial marble composition adapted for making building construction units, comprising a base mixture in proportions of from ½ to 2 parts white cement, from ½ to 3 parts sand, mineral coloring ingredient a variable amount, all made into a plastic composition by a solution comprising proportions from 2 to 3 pounds sodium silicate, from 1 to 1¼ pounds boracic acid, from 2¼ to 5 pounds casein, from 2¼ to 7 ounces of sal-ammoniac, and 30 gallons of water.

ARVID HEDE.